United States Patent
Fornoff et al.

(10) Patent No.: US 10,939,980 B2
(45) Date of Patent: Mar. 9, 2021

(54) METHOD FOR PLANNING A SINTERING OF A DENTAL PROSTHESIS PART

(71) Applicant: SIRONA DENTAL SYSTEMS GMBH, Bensheim (DE)

(72) Inventors: Peter Fornoff, Reichelsheim (DE); Christian Schmidt, Bensheim (DE)

(73) Assignee: DENTSPLY SIRONA Inc., York, PA (US)

( * ) Notice: Subject to any disclaimer, the term of this patent is extended or adjusted under 35 U.S.C. 154(b) by 830 days.

(21) Appl. No.: 15/105,530

(22) PCT Filed: Dec. 18, 2014

(86) PCT No.: PCT/EP2014/078387
§ 371 (c)(1),
(2) Date: Jun. 16, 2016

(87) PCT Pub. No.: WO2015/091744
PCT Pub. Date: Jun. 25, 2015

(65) Prior Publication Data
US 2016/0317257 A1    Nov. 3, 2016

(30) Foreign Application Priority Data

Dec. 18, 2013 (DE) ............ 10 2013 226 497.6

(51) Int. Cl.
*A61C 5/77* (2017.01)
*A61C 13/20* (2006.01)
(Continued)

(52) U.S. Cl.
CPC ............ *A61C 5/77* (2017.02); *A61C 13/0004* (2013.01); *A61C 13/20* (2013.01); *F27B 17/025* (2013.01)

(58) Field of Classification Search
CPC .......... A61C 5/77; A61C 13/20; F27B 17/025
See application file for complete search history.

(56) References Cited

U.S. PATENT DOCUMENTS

| 4,796,688 A | 1/1989 | Gundlach |
| 5,239,178 A | 8/1993 | Derndinger |
| (Continued) | | |

FOREIGN PATENT DOCUMENTS

| EP | 0485803 A1 | 5/1992 |
| EP | 2620733 A1 | 7/2013 |
| (Continued) | | |

OTHER PUBLICATIONS

International Search Report; PCT/EP2014/078387; Mar. 25, 2015 (completed); dated Apr. 10, 2015.

(Continued)

*Primary Examiner* — Jacob T Minskey
*Assistant Examiner* — Melody Tsui
(74) *Attorney, Agent, or Firm* — DENTSPLY SIRONA Inc.

(57) ABSTRACT

The invention relates to a method for planning a heat treatment of a dental prosthesis part (1), in which a 3D model (9) of the dental prosthesis part to be produced (1) already exists. A temperature profile (16) for the heat treatment of the dental prosthesis part (1) is automatically determined by a computer (17) as a function of determined geometric parameters (10, 11, 12, 13) of the dental prosthesis part to be produced (1) and/or of determined material parameters of the dental prosthesis part to be produced (1).

17 Claims, 2 Drawing Sheets

(51) Int. Cl.
*F27B 17/02* (2006.01)
*A61C 13/00* (2006.01)

(56) References Cited

U.S. PATENT DOCUMENTS

| | | | |
|---|---|---|---|
| 6,252,717 | B1 | 6/2001 | Grosskopf |
| 6,288,382 | B1 | 9/2001 | Ishihara |
| 2007/0296956 | A1 | 12/2007 | Haugholt |
| 2011/0147968 | A1* | 6/2011 | Zubler .................. A61C 13/20 264/16 |
| 2014/0336805 | A1 | 11/2014 | Brotzge |
| 2015/0247672 | A1 | 1/2015 | Litomisky |
| 2015/0230896 | A1* | 8/2015 | Korten ............... A61C 13/0004 264/19 |

FOREIGN PATENT DOCUMENTS

| | | |
|---|---|---|
| JP | 2004347208 A | 12/2004 |
| JP | 2013153929 A | 8/2013 |
| WO | 200008415 A1 | 2/2000 |
| WO | 03098148 A1 | 11/2003 |
| WO | 2011118839 A1 | 9/2011 |
| WO | 2014016320 A1 | 1/2014 |
| WO | 2015091744 A1 | 6/2015 |

OTHER PUBLICATIONS

Written Opinion of the International Searching Authority; PCT/EP2014/078387; Mar. 25, 2015 (completed); dated Apr. 10, 2015.
International Preliminary Report on Patentability; PCT/EP2014/078387 Mar. 25, 2015 (completed); dated Apr. 10, 2015.

* cited by examiner

METHOD FOR PLANNING A SINTERING OF A DENTAL PROSTHESIS PART

TECHNICAL FIELD

The invention relates to a method for planning the sintering of a dental prosthesis part, whereby a 3D model of the dental prosthesis part to be produced has already been designed.

BACKGROUND OF THE INVENTION

Several methods for planning sintering processes are known from prior art. Prior to sintering in a sintering furnace, the user can select a specific program with a suitable temperature profile for the dental prosthesis part to be produced, whereby the user takes the materials used and the dimensions of the dental prosthesis part into account.

DE 10 2011 056 211 B3 discloses equipment and a sintering method, particularly dental frameworks, whereby one tray is covered by a closing element, whereby the frame of the tray is connected to an inert gas supply. The heating rate, the holding temperature as well as a cool-down time can be set manually.

EP 2 620 733 A1 discloses a dental device, like a dental furnace with at least one operating program, with one memory and with at least one capturing device, such as a camera. The object can be captured by means of the camera and displayed in captured form by means of a display unit. Several predetermined reference objects are deposited in a database. If a certain number of characteristics of a reference object matches the image of the captured object, a corresponding operating program is initiated.

US 2009/0079101 A1 discloses a sintering furnace with a heat insulated camera and a temperature-measuring device. One temperature profile has a heating rate of 140° C. per minute, a holding temperature of 1400° C. and a cooling rate of 50° C. per minute.

DE 10 2008 013 555 A1 discloses a sintering furnace for production of dental prosthesis parts, whereby the sintering of the dental prosthesis parts is performed along a sintering line. While passing through this sintering line, the dental prosthesis parts are exposed to different temperatures. The sintering line is thus divided into individual sintering line segments, which can be adjusted to different temperatures. The carriers that carry the dental prosthesis parts are moved along the sintering line by means of a slider. Every sintering line segment can be set to different temperatures. By such means, different temperature progressions for sintering different ceramics can be set.

One drawback of this method is the fact that, due to operator errors, the operator can configure incorrect temperature profiles, which can lead to manufacturing defects of the dental prosthesis part to be produced. A temperature profile with a heating rate that is too high can, in the case of oxide ceramics for example, cause cracks on the surface of the dental prosthesis part.

The present invention is based on the task of providing a method for planning a sintering in such a way that such operating errors are prevented.

SUMMARY OF THE INVENTION

The invention relates to a method for planning the heat treatment of a dental prosthesis part, whereby a 3D model of the dental prosthesis part to be produced already exists. Depending on certain geometrical parameters of the dental prosthesis part to be produced and on certain material parameters of the dental prosthesis part to be produced, a temperature profile for heat treatment such as sintering, crystallization or glazing of the dental prosthesis part is determined automatically by means of a computer, whereby the material parameters of a material that was selected for manufacturing of the dental prosthesis part consist of thermal conductivity, thermal shock resistance, maximum heat-up rate and/or temperature limit value for phase transformation of the material.

In the case of increasing thermal conductivity of the material used, the dental prosthesis part can be sintered through quicker, so that the holding time of the temperature profile can be reduced.

In the case of high thermal shock resistance of the material, the heating rate can also be increased without causing damage to the dental prosthesis part during sintering.

According to the present method, a theoretical maximum heating rate for the respective dental prosthesis part can be established or determined. For determining this maximum heating rate, mechanical coefficients of the material in question can be used, such as a linear expansion coefficient, an elastic modulus, strength, Poisson's ratio, fracture toughness, an initial crack length or form factor, as well as thermodynamic coefficients such as volume-related heat capacity or heat conductivity, as well as the geometrical parameters of the dental prosthesis part.

This method presupposes that the dental prosthesis part has already been designed, so that a 3D model of the dental prosthesis part exists. The dental prosthesis part can e.g. be a full prosthesis for an implant, a dental prosthesis, a full crown, a partial crown, a bridge of several whole teeth or an inlay. Based on certain selection criteria, the suitable temperature profile is determined depending on geometrical parameters and/or material parameters of the selected material. Determining the temperature profile can, for example, be performed via automatic selection of the temperature profile from a multitude of different temperature profiles stored in a database or by computing an individual temperature profile. The temperature profile can contain at least one heating step or several heating steps, whereby it is decisive that a maximum heating rate is not exceeded; the heating rate depends on the material used and substantially on the wall thickness of the dental prosthesis part. This could result in cracks forming on the surface of the dental prosthesis part or in the upper layers flaking off of the dental prosthesis part. During the sintering process, the outer layer of the dental prosthesis part can shrink faster than the inner layers of the dental prosthesis part, resulting in mechanical tensions. After heating up the dental prosthesis part according to the established heat-up rate, a holding temperature is kept for a certain holding time, whereby a cooling phase follows. The cooling phase can, for example, be initiated by opening the door of the sintering furnace used, so that cool air can flow in. The holding temperature and holding time are selected such that the dental prosthesis part to be produced is entirely sintered through, but no over-sintering occurs. In case of over-sintering, the grain size of the material to be sintered can exceed an established limit value, which can result in the reduced strength of the dental prosthesis part.

This method has the advantage that it excludes operational errors during manual selection of a suitable temperature profile, thus preventing manufacturing defects.

A further advantage of this method consists in the fact that in consideration of geometrical parameters and/or material parameters, a suitable temperature profile can be selected that combines the shortest possible duration with the highest possible heat rate and shortest possible holding time, so that the overall heat treatment duration of the dental prosthesis part is reduced.

Preferably, the geometrical parameters of the dental prosthesis part can be maximum lateral wall thickness, maximum occlusal wall thickness, a ratio of the maximum occlusal wall thickness and maximum lateral wall thickness, the maximum cross section of the dental prosthesis part, the total volume of the dental prosthesis part, the maximum total length of the dental prosthesis part and/or the maximum change in the cross section of the dental prosthesis part.

The maximum lateral wall thickness relates to the side wall thickness of the dental prosthesis part, for example on the labial surfaces of incisors or on the buccal surfaces of molars. The maximum occlusal wall thickness relates to the wall thickness of an occlusal surface of the dental prosthesis part. The maximum cross section of the dental prosthesis part relates to a cross section that is vertical to a tooth axis of the dental prosthesis part.

Based on these geometrical parameters, a temperature profile is selected, whereby a certain heating rate and a certain holding time at a certain holding temperature are determined in particular.

Preferably, the temperature profile can be determined such that with an increasing maximum lateral wall thickness, with an increasing maximum occlusal wall thickness, with an increasing maximal cross section of the component and/or with an increasing total volume of the dental prosthesis part, the heating rate of the temperature profile decreases, the holding time of the temperature profile increases and/or the holding temperature of the temperature profile decreases.

With an increasing wall thickness, the mechanical tensions during the sintering process also increase, so that the heating rate has to be reduced, in order to prevent the dental prosthesis part from being damaged.

With an increasing cross section or total volume of the dental prosthesis part, the holding time increases as it takes longer to entirely sinter through the component.

The temperature profile can be advantageously determined such that with an increasing heat-conductivity and/or increasing thermal shock resistance, the heating rate of the temperature profile increases.

This enables the heating rate to be increased depending on the thermal conductivity and the thermal shock resistance of the higher material, so that the total duration of the sintering can be shortened.

Preferably, the heat treatment can consist of sintering, crystallization, a combination of sintering and glazing or a combination of crystallization and glazing.

The sintering can be applied with oxide ceramics such as zirconium dioxide or aluminum oxide, as well as with non-precious metal alloys such as CoCrMo alloy.

Crystallization is performed particularly with glass ceramics with the lithium disilicate system of materials.

Finish-sintering is performed on dental restoration components that are made from pre-sintered oxide ceramics, particularly zirconium dioxide and aluminum oxide. Metal pellets that are pressed from powder and pre-sintered, particularly CoCrMo alloys, have to be sintered as well after they have been further processed mechanically by grinding or milling.

All metallic or ceramic basic materials can be faced or glazed after sintering by means of further burning processes.

As part of a so-called surface finish, painting can also be performed along with glazing, which would be burned in the same furnace process.

Glass ceramic has the additional advantage that it can be crystallized, painted and glazed in the same burning process.

Preferably, the selected material for producing a dental prosthesis part can be zirconium dioxide, whereby the dental prosthesis part to be produced can be an individual tooth, a full crown, a partial crown or an inlay. The total volume of a dental prosthesis part can maximally equal the volume of a molar, whereby the maximum lateral wall thickness and/or the maximum occlusal wall thickness range is below the limit value of 6 mm. In consideration of these factors, a first temperature profile for a sintering is established having a heating rate between 100° C./minute and 400° C./minute, a holding temperature between 1500° C. and 1600° C. and a holding time between 5 minutes and 10 minutes.

Due to the relatively small wall thickness and the low total volume of the dental prosthesis part, a relatively high heating rate is possible, so that the total duration is reduced. The low total volume also enables the dental prosthesis part to be sintered quicker, so that a relatively short holding time can be selected, which additionally shortens the total duration of the sintering. The first temperature profile makes a quick sintering for relatively small dental prosthesis parts possible.

Preferably, the selected material can be zirconium dioxide, whereby the dental prosthesis part to be produced is a bridge consisting of no more than 6 connected teeth or 6 individual teeth. In consideration of these factors, a second temperature profile for a sintering is established having a heating rate between 70° C./minute and 200° C./minute, a holding temperature between 1450° C. and 1550° C. and a holding time between 20 minutes and 40 minutes.

The second temperature profile is selected for dental prosthesis parts with a total volume of no more than six teeth, whereby a longer holding time for sintering through of the dental prosthesis part is required than in the first temperature profile.

Preferably, the selected material can be zirconium dioxide, whereby the dental prosthesis part to be produced comprises more than 6 individual teeth, whereby a third temperature profile is established having a heating rate between 10° C./minute and 70° C./minute, with a holding temperature between 1500° C. and 1600° C. and a holding time between 100 minutes and 140 minutes.

The third temperature profile is selected for relatively large dental prosthesis parts with a total volume of more that six teeth, whereby the heating rate is significantly reduced in comparison to the first temperature profile and the second temperature profile, in order to prevent cracks from forming on the surface of the dental prosthesis part. The holding time is significantly increased in comparison with the first temperature profile and the second temperature profile, in order to ensure complete sintering through of the dental prosthesis part.

Preferably, the selected material can be aluminum oxide ($Al_2O_3$), whereby a fourth temperature profile is established having a heating rate between 10° C./minute and 70° C./minute, with a holding temperature between 1500° C. and 1600° C. and a holding time between 100 minutes and 140 minutes.

The fourth temperature profile is suitable for the material aluminum oxide, whereby, independently of the size of the dental prosthesis part, the heating rate and the holding time is selected similar to the third temperature profile.

Preferably, the 3D model of the dental prosthesis part to be produced can be graphically displayed by way of a display device, whereby certain sections of the 3D model are graphically highlighted; these sections exceed a certain limit value concerning labial or occlusal wall thickness.

The display device can, for example, be a monitor, which graphically displays the designed 3D model of the dental prosthesis part to be produced. Those sections, in which the wall thickness exceeds the determined limit value, like for example 3 mm, are graphically highlighted. In this way, the user can recognize which sections of the 3D model do not comply with the geometrical parameters for the first temperature profile or the second temperature profile. The user, such as a dentist or a dental technician, can then adjust these highlighted sections accordingly.

Preferably, the user can manually adjust the highlighted sections using virtual tools, or the highlighted sections can be automatically adjusted by the computer in such a way that these sections fall below the limit value for labial or occlusal wall thickness. In this way, sintering for the dental prosthesis part to be produced according to this adjusted 3D model can be performed using the first temperature profile instead of the second temperature profile.

Hence, the user can adjust the highlighted areas in such a way that they fall below the limit value for the wall thickness of e.g. 3 mm. Thus, the geometrical parameters for the first temperature profile are fulfilled, so that sintering can be performed using the first temperature profile, which results in a shorter total duration of sintering compared to sintering with the second temperature profile.

Preferably, determining the suitable temperature profile can be performed by selecting it from several temperature profiles that are stored in a database.

For example, the different temperature profiles can be saved in a memory arranged inside a microcomputer that is integrated in the sintering furnace. Alternatively, this memory can also be integrated in a computer that is arranged outside the sintering furnace.

The characteristics of the temperature profiles such as the heating rate, the holding time and/or the holding temperature can be graphically displayed by means of a display unit. The display unit can, for example, be a display that is adjusted to the sintering furnace. The selection is then performed automatically by a computer, whereby the characteristics of the selected temperature profile can be graphically displayed.

In a preferred scenario, determining the suitable temperature profile can be performed by computation of an individual temperature profile that is calculated in consideration of the geometrical parameters and/or material parameters of the dental prosthesis part to be produced.

Consequently, this allows for an individual temperature profile to be calculated in consideration of the geometrical parameters and/or the material parameter. In this context, known mathematical methods such as interpolation can be used.

The invention further relates to a system for performing a method for planning heat treatment of a dental prosthesis part by means of a sintering furnace, a system which comprises a computer, whereby a 3D model of the dental prosthesis part to be produced already exists. Depending on certain geometrical and material parameters of the dental prosthesis part to be produced, a temperature profile for sintering the dental prosthesis part can be automatically established by a computer.

Thus, the system enables the method described above to be performed, whereby the computer automatically determines a suitable temperature profile for the respective dental prosthesis part depending on the geometrical and material parameters.

One advantage of this system is the fact that operational errors, which are likely to occur when users such as dentists or dental technicians manually select a suitable temperature profile, can be prevented.

Preferably, the system can be provided with a display unit, whereby the 3D model of the dental prosthesis part to be produced can be graphically displayed by the display unit, whereby certain sections of the 3D model can be graphically highlighted, which exceed a certain limit value concerning labial or occlusal wall thickness.

By highlighting the sections that do not comply with certain geometrical parameters, such as wall thickness, for the first temperature profile, the user is enabled to better evaluate the measurements of these sections and the resulting required adjustments of the 3D model.

Preferably, the system can be equipped with operating means, whereby the user can manually adjust the highlighted sections using the operating means by means of virtual tools in such a way, or the highlighted sections can be automatically adjusted by the computer in such a way that these sections fall below the limit value of 6 mm for labial or occlusal wall thickness. In this way, sintering for the dental prosthesis part to be produced according to this adjusted 3D model can be performed using the first temperature profile instead of the second temperature profile.

By means of this adjustment of the 3D model, the sintering can be performed using the first temperature profile instead of the second temperature profile, so that the total duration of sintering is shortened.

Preferably, the system can be equipped with a memory, whereby determining the suitable temperature profile is performed by selecting it out of several temperature profiles that are stored in a database in the memory.

In a preferred scenario, determining the suitable temperature profile can be performed by computation of an individual temperature profile by the computer, whereby the individual temperature profile is calculated in consideration of the geometrical and/or material parameters of the dental prosthesis part to be produced.

BRIEF DESCRIPTION OF THE DRAWINGS

The invention is explained with reference to the drawings. In the drawings.

DETAILED DESCRIPTION OF THE INVENTION

Figure 1:
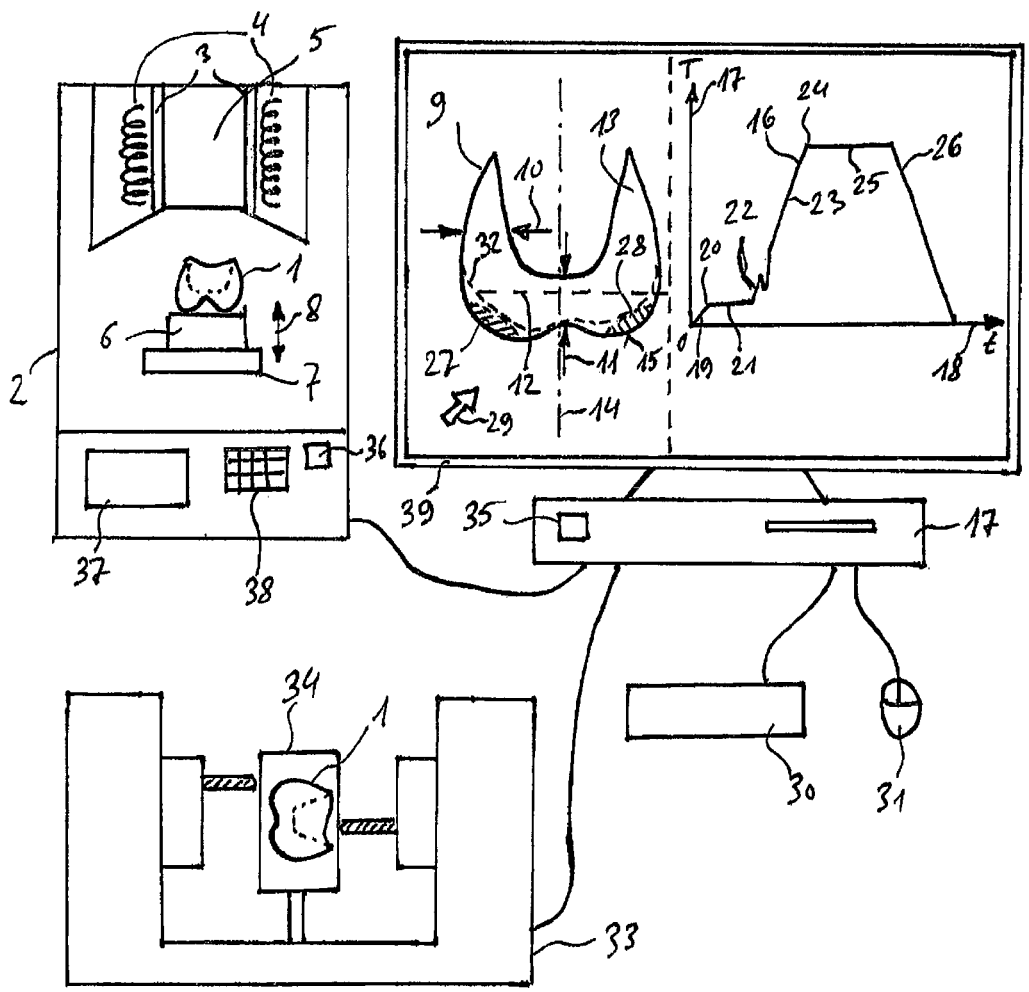
FIG. 1 shows a sketch to illustrate the present method.

FIG. 1 shows a sketch illustrating the present method for planning heat treatment of dental prosthesis part 1 with sintering furnace 2. The sintering furnace is provided with insulation elements 3 and heating elements 4 for regulating the temperature inside burning chamber 5. The heat treatment of dental prosthesis part 1 such as sintering, crystallization or glazing is performed by starting with the first step, in which chamber 5 is heated up by heating elements 4. After a certain load temperature, e.g. 300° C., is reached, the chamber 5 is opened in a second step, during which base 6 is moved to end position 7. In a third step, the user, such as a dentist or a dental technician, positions dental prosthesis part 1 to be sintered on base 6. In a fourth step, the chamber closes again, whereby the base is moved to an upper end position, indicated by arrows 8. In a fifth step, chamber 5 is further heated by heating elements 4 until a holding temperature is reached, and this holding temperature is maintained during a certain holding time. A cooling phase follows in a sixth step. The cooling phase can be initiated, for example, by switching off the heating elements or additionally by opening chamber 5 by moving the base to the lower end position 7.

While performing the present method for planning the heat treatment, 3D model 9 of dental prosthesis part 1 is already available. The design of the dental prosthesis part has already been completed. The 3D model 9 is graphically displayed by means of display unit 39, such as a monitor. The 3D model 9 has certain geometrical parameters of dental prosthesis part 1 like a lateral wall thickness 10, an occlusal wall thickness 11, a maximum cross section 12, indicated by a dashed line, as well as a total volume 13.

Furthermore, the material used to create the dental prosthesis part to be produced was already determined during the design. The materials used can include, for example, oxide ceramics such as zirconium dioxide, or aluminum oxide, or non-precious metal alloys such as a CoCrMo alloy. The maximum cross section 12 of the dental prosthesis part can be determined vertically to tooth axis 14, which can correspond to a symmetry axis of the dental prosthesis part. The lateral wall thickness 10 can e.g. be determined vertically to tooth axis 14 in the labial or buccal area of the dental prosthesis part. The occlusal wall thickness 11 can e.g. be determined parallel to tooth axis 14 on an occlusal surface 15 of 3D model 9. Using the geometrical parameters 10, 11, 12, 13 as well as the material parameters, a computer 17 automatically determines a suitable temperature profile 16.

The computer 17 can be a microcomputer, a microchip or a common personal computer. The computer 17 can be arranged externally, outside the sintering furnace 2. Alternatively, the computer 17 along with the display unit 39 can be integrated in the sintering furnace 2.

The temperature profile 16 is depicted as a graph of temperature 17 as a function of time 18. In a first phase 19, the chamber 5 is heated using the first heating rate to reach a pre-drying temperature 20, in a second phase 21, the pre-drying temperature is maintained for a first holding time, in a third phase 22, the temperature inside the chamber 5 is heated to reach a loading temperature of e.g. 300° C. In a fourth phase, the chamber 5 is loaded with the dental prosthesis part 1 to be sintered, so that the temperature is slightly reduced. In a fifth phase 23, the temperature in the chamber 5 rises according to a second heating rate, until it reaches a second holding temperature 24. In a sixth phase 25, the heating elements 4 are controlled in such a way that the holding temperature 24 is maintained for the duration of a certain holding time. In the seventh phase 26, the cooling of the dental prosthesis part 1 follows. Thus, the computer 17 determines the suitable temperature profile 16 depending on the geometrical parameters, particularly on the maximum lateral wall thickness 10, the maximum occlusal wall thickness 11 and the total volume 13 as well as depending on the material parameters of the selected material. Thereby, the heating rates for the heating-up phases 19, 23, the holding temperatures 20, 24 and the holding times for the phases 21, 25 are established in particular.

During a subsequent plausibility check, it can then be examined whether the designed 3D model 9 of dental prosthesis part 1 fulfills certain requirements regarding the geometrical parameters, such as lateral or occlusal wall thickness. Sections that do not fall within the determined limit values, like sections 27 and 28 that are indicated by a dashed line, can then be highlighted. For example, sections 27, 28 can be highlighted, because they exceed a limit value of 6 mm regarding the occlusal wall thickness. Subsequently, highlighted sections 27 and 28 can either be manually changed by the user by means of a virtual tool 29, such as a cursor, or automatically by the computer 17 in such a way that the limit values regarding the geometrical parameters are complied with. Control of the virtual tool 29 performed via connected input means such using a keyboard 30 or a mouse 31. By adjusting or forming the 3D model 9, an adjusted 3D model 32 is created which is depicted by a dashed line. The adjusted 3D model 32 is then used by a CAM processing machine 33 to create the dental prosthesis part 1 to be sintered out of a pellet 34 in a fully automated process. After dental prosthesis part 1 to be sintered has been produced, the sintering in sintering furnace 2 is performed as described above.

Thus, this method has the advantage that even prior to producing the dental prosthesis part by a CAM processing machine 33 and prior to sintering dental prosthesis part 1 in sintering furnace 2, a suitable temperature profile 16 can be determined and a plausibility check as well as a possible adjustment of the 3D model 9 can be performed.

The temperature profile 16 can e.g. be established by selection from a number of temperature profiles that are stored in a memory 35. This memory 35 is integrated in the computer 17. As an alternative, the temperature profiles can be stored in a second memory 36, which is integrated in the sintering furnace 2.

The suitable temperature profile can also be established by way of computing an individual temperature profile, which is calculated by the computer 17.

The present method for planning the heat treatment can also be performed for several dental prosthesis parts and several heat treatments before sintering commences. For that, an order overview can be created comprising several orders. An order can thereby comprise the identification data such as the name of the patient, the type of the dental prosthesis part, such as a full crown, a partial crown or a bridge, the material for the creation of the dental prosthesis part, the type of heat treatment, like sintering, crystallization or glazing, and the type of suitable temperature profile. Orders with these identification data can, for example, be displayed on a display 37 that is integrated in the sintering furnace 2. As an alternative, orders with the identification data can also be displayed with the display unit 39. Prior to performing sintering, the user can select the respective order with the assigned temperature profile using the control panel 38. After that, sintering is performed automatically with a suitable temperature profile.

Figure 2:
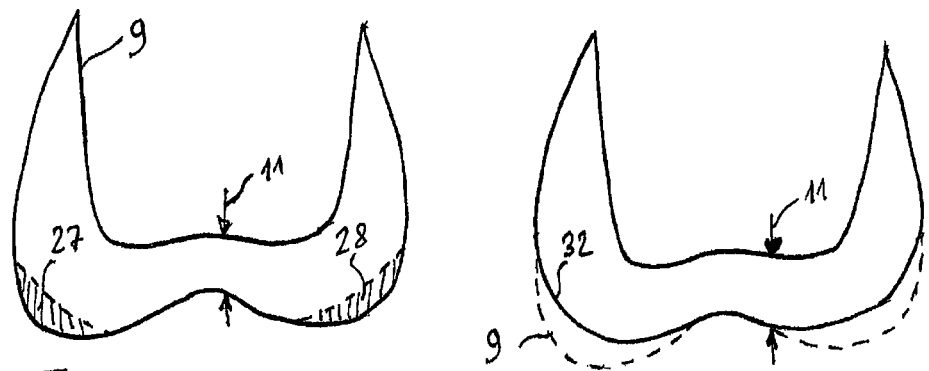
FIG. 2 shows a 3D model of the dental prosthesis part with highlighted areas.

FIG. 2 shows the 3D model 9 of dental prosthesis part 1 from FIG. 1, whereby sections 27 and 28 are highlighted because they exceed a limit value of e.g. 6 mm regarding occlusal wall thickness.

After adjustment or formation of the 3D model 9, which is depicted with a dashed line, an adjusted 3D model 32 is created. The adjusted 3D model 32 is then used to create dental prosthesis part 1 by means of the CAM processing machine 33 from FIG. 1.

Figure 3:
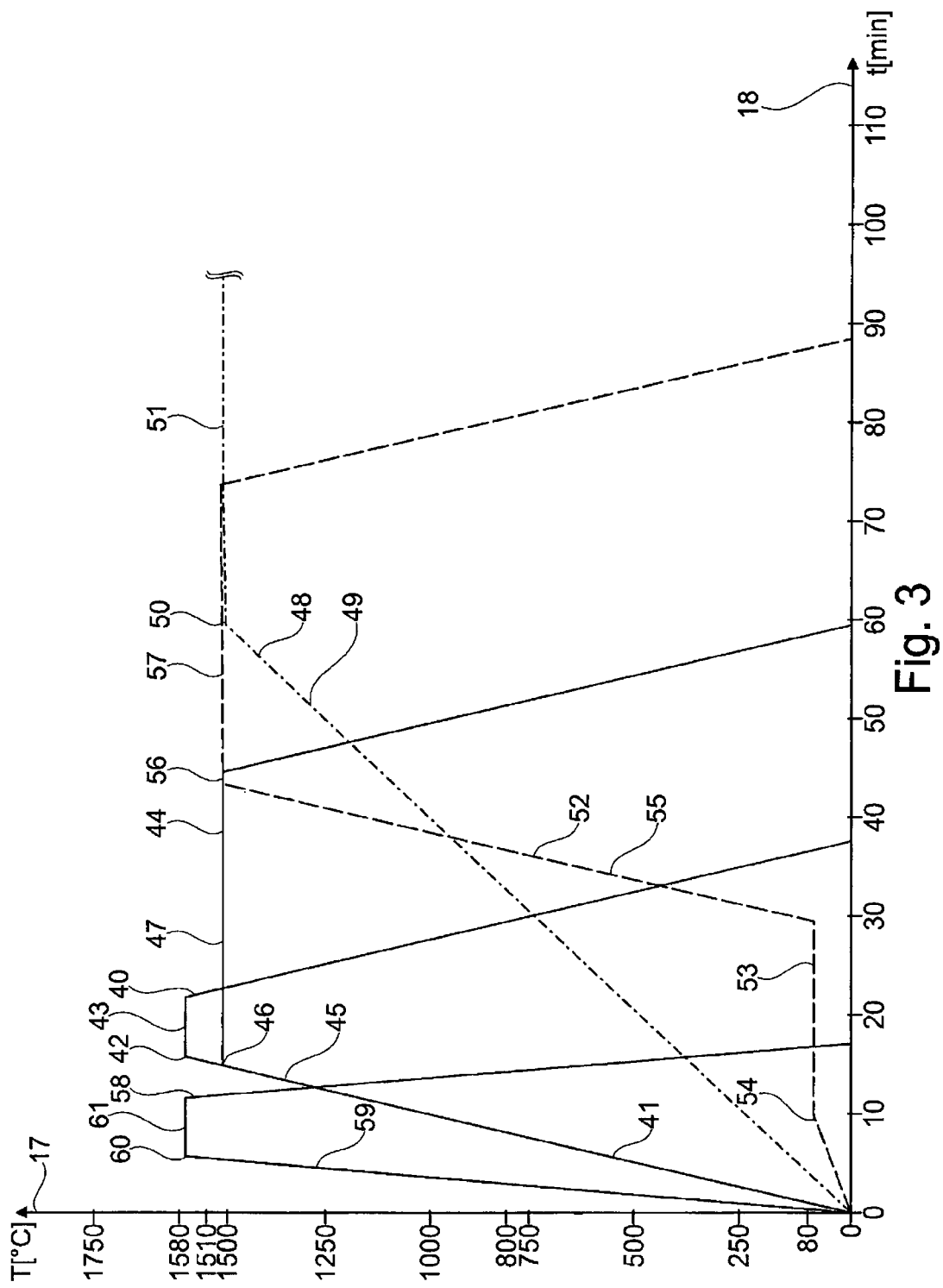
FIG. 3 shows several temperature profiles for performing sintering.

FIG. 3 shows several temperature profiles for performing a sintering, whereby the temperature 17 in ° C. is depicted as a function of the time 18 in minutes. A first temperature profile 40 has a heating rate 41 of 100° C./min, a holding temperature 42 of 1580° C. and a holding time 43 of 6 minutes. A second temperature profile 44 has a heating rate 45 of 100° C./min, a holding temperature 46 of 1510° C. and a holding time 47 of 30 minutes. A third temperature profile 48, indicated by a dashed and dotted line, has a heating rate 49 of 25° C./min, a holding temperature 50 of 1510° C. and a holding time 51 of 120 minutes. A fourth temperature profile 52, indicated by a dashed line, has a pre-drying phase 53, whereby the temperature is heated up to reach a pre-drying temperature 54 and maintained for 20 minutes. After that, the heating-up phase follows with a heating rate 55 of 100° C./minute up to a holding temperature 56 of 1510° C. This holding temperature 56 is then maintained for the duration of a holding time 57 of 30 minutes, followed by a cooling phase. A fifth temperature profile 58 has a heating rate 59 of 300° C./min, a holding temperature 60 of 1580° C. and a holding time of 6 minutes.

The first temperature profile 40 is particularly suitable for small dental prosthesis parts with a small wall thickness of e.g. less than 6 mm and a small total volume, whereby the high heating rate 41 and the short holding time 43 of 6 minutes enable a short sintering duration. The second temperature profile 44 is suitable for medium-large dental prosthesis parts with a maximum wall thickness of more than 6 mm and consisting of no more than six individual teeth. The third temperature profile 48 is suitable for large dental prosthesis parts, such as bridges consisting of more than six individual teeth. The fourth temperature profile 52 is suitable for materials that require pre-drying prior to sintering.

The 3D model 9 from FIG. 1 and FIG. 2 can thus be formed by the user or automatically in such a way that the requirements or limit values for a certain temperature profile are fulfilled. FIG. 2 shows that the 3D model 9 has been adjusted in such a way that the occlusal wall thickness 11 does not exceed a limit value of 6 mm. Thus, the sintering for dental prosthesis part 1 to be produced according to this adjusted 3D model 32 can be performed using the first temperature profile 40 instead of the second temperature model 44. The advantage of this adjustment lies in the fact that the duration of sintering is reduced.

LIST OF REFERENCE NUMERALS

1 Dental prosthesis part
2 Sintering furnace
3 Insulation element
4 Heating element
5 Burning chamber
6 Base
7 End position
8 Arrow
9 3D model
10 Lateral wall thickness
11 Occlusal wall thickness
12 Cross section
13 Total volume
14 Tooth axis
15 Occlusion surface
16 Temperature profile
17 Computer
18 Time
19 First phase
20 Pre-drying temperature
21 Second phase
22 Third phase
23 Fifth phase
24 Holding temperature
25 Sixth phase
26 Seventh phase
27 Section
28 Section
29 Virtual tool
30 Keyboard
31 Mouse
32 Adjusted 3D model
33 CAM processing machine
34 Pellet
35 Memory
36 Second memory
37 Display
38 Control panel
39 Display unit
40 First temperature profile
41 Heating rate
42 Holding temperature
43 Holding temperature
44 Second temperature profile
45 Heating rate
46 Holding temperature
47 Holding temperature
48 Third temperature profile
49 Heating rate
50 Holding temperature
51 Holding temperature
52 Fourth temperature profile
53 Pre-drying phase
54 Pre-drying temperature
55 Heating rate
56 Holding temperature
57 Holding temperature
58 Fifth temperature profile
59 Heating rate
60 Holding temperature

The invention claimed is:

1. A method for planning a heat treatment of a dental prosthesis part comprising the steps of:
providing a virtual 3D model of the dental prosthesis part;
automatically computing a temperature profile for the heat treatment of the dental prosthesis, the temperature profile includes an automatically computed heating rate, an automatically computed holding temperature and an automatically computed holding time;
heat treating the dental prosthesis part according to the temperature profile using a sintering furnace adapted with the computed temperature profile
wherein the temperature profile is automatically computed based on one or more geometrical parameters of the virtual 3D model and material parameters of the dental prosthesis part,
wherein the one or more material parameters of a material of the dental prosthesis part are selected from the group consisting of a heat conductivity, a thermal shock resistance, a maximum heat-up rate and a temperature limit value for a phase transformation of the material, and
wherein the one or more geometrical parameters are determined by measuring dimensions of the virtual 3D model of the dental prosthesis part.

2. The method according to claim 1, further comprising automatically determining the temperature profile such that with an increasing maximum lateral wall thickness, an increasing maximum occlusal wall thickness, an increasing maximal cross section and/or an increasing total volume of the dental prosthesis part, (i) the heating rate of the temperature profile decreases, (ii) the holding time of the temperature profile increases and/or (iii) the holding temperature of the temperature profile decreases.

3. The method according to claim 1, wherein the temperature profile is automatically computed such that with an increasing heat-conductivity and/or thermal shock resistance of the material, the heating rate of the temperature profile increases.

4. The method according to claim 1, wherein the heat treatment includes sintering, crystallization, a combination of sintering and glazing or a combination of crystallization and glazing.

5. The method according to claim 1, wherein the selected material for production of the dental prosthesis part is zirconium dioxide (ZrO2), wherein the dental prosthesis part is an individual tooth, a full crown, a partial crown or an inlay, wherein the total volume of the dental prosthesis part does not exceed a volume of a standard molar, wherein the maximum lateral wall thickness and/or the maximum occlusal wall thickness fall below a limit value of 6 mm, wherein a first temperature profile is established for sintering at a heating rate between 100° C./minute and 400° C./minute, with a holding temperature between 1500° C. and 1600° C. and a holding time between 5 minutes and 10 minutes.

6. The method according to claim 5, wherein the material selected is zirconium dioxide (ZrO2), wherein the dental prosthesis part is a bridge consisting of no more than 6 connected teeth or no more than 6 individual teeth or partial crowns, wherein a second temperature profile is established for a sintering with a heating rate between 70° C./minute and 200° C./minute, with a holding temperature between 1450° C. and 1550° C. and a holding time between 20 minutes and 40 minutes.

7. The method according to one of the claim 1, wherein the selected material is zirconium dioxide (ZrO2), wherein the dental prosthesis part is a bridge consisting of more than 6 individual teeth, wherein a third temperature profile is established for a sintering with a heating rate between 10° C./minute and 70° C./minute, with a holding temperature between 1500° C. and 1600° C. and a holding time between 100 minutes and 140 minutes.

8. The method according to claim 1, wherein the selected material is aluminum oxide (Al$_2$O$_3$), wherein a fourth temperature profile is established for a sintering with a heating rate between 10° C./minute and 70° C./minute, with a holding temperature between 1500° C. and 1600° C. and a holding time between 100 minutes and 140 minutes.

9. The method according to claim 6, further comprising graphically displaying the virtual 3D model of the dental prosthesis part using a display unit wherein one or more sections of the virtual 3D model are graphically highlighted when the one or more sections exceed a predefined limit value concerning labial or occlusal wall thickness.

10. The method according to claim 9, wherein a user adjusts the highlighted one or more sections manually using virtual tools, or that the highlighted one or more sections are automatically adjusted by the computer such that that they fall below the predefined limit value for labial wall thickness or occlusal wall thickness so that for the dental prosthesis part according to this adjusted virtual 3D model the sintering can be performed using a first temperature profile instead of a second temperature profile.

11. The method according to claim 1 wherein the step of determining the temperature profile is performed by selecting from a number of temperature profiles that are stored in a memory.

12. The method according to claim 1, wherein said dimensions are selected from the group consisting of a maximum lateral wall thickness, a maximum occlusal wall thickness, a ratio of the maximum occlusal wall thickness and the maximum lateral wall thickness, a maximum cross section, a total volume, a maximum total length and a maximum change in a cross section.

13. A system for planning the heat treatment of a dental prosthesis part comprising a processor configured to:
provide a virtual 3D model of the dental prosthesis part;
automatically compute a temperature profile for the heat treatment of the dental prosthesis, the temperature profile includes an automatically computed heating rate, an automatically computed holding temperature and an automatically computed holding time;
heat treat the dental prosthesis part according to the temperature profile using a sintering furnace adapted with the computed temperature profile
wherein the temperature profile is automatically computed based on one or more geometrical parameters of the virtual 3D model and material parameters of the dental prosthesis part,
wherein the one or more material parameters of a material of the dental prosthesis part are selected from the group consisting of a heat conductivity, a thermal shock resistance, a maximum heat-up rate and a temperature limit value for a phase transformation of the material, and
wherein the one or more geometrical parameters are determined by measuring dimensions of the virtual 3D model of the dental prosthesis part.

14. The system according to claim 13, wherein the processor is further configured to automatically determine the temperature profile such that with an increasing maximum lateral wall thickness, an increasing maximum occlusal wall thickness, an increasing maximal cross section and/or an increasing total volume of the dental prosthesis part, (i) the heating rate of the temperature profile decreases, (ii) the holding time of the temperature profile increases and/or (iii) the holding temperature of the temperature profile decreases.

15. The system according to claim 13, wherein the processor is further configured to automatically compute the temperature profile such that with an increasing heat-conductivity and/or thermal shock resistance of the material, the heating rate of the temperature profile increases.

16. The system according to claim 13, wherein the processor is further configured to perform a heat treatment that includes sintering, crystallization, a combination of sintering and glazing or a combination of crystallization and glazing.

17. The system according to claim 13, wherein the processor is further configured to determine the temperature profile by selecting from a number of temperature profiles that are stored in a memory.

* * * * *